(12) United States Patent
Schneider

(10) Patent No.: US 8,826,134 B2
(45) Date of Patent: Sep. 2, 2014

(54) PIVOT COMMAND FOR PLAYLIST

(75) Inventor: Steve Schneider, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 237 days.

(21) Appl. No.: 12/879,982

(22) Filed: Sep. 10, 2010

(65) Prior Publication Data

US 2012/0066593 A1    Mar. 15, 2012

(51) Int. Cl.
  *G06F 3/00* (2006.01)

(52) U.S. Cl.
  USPC ............................ 715/716; 715/727

(58) Field of Classification Search
  CPC .................... G06F 3/00; G06F 3/048
  See application file for complete search history.

(56) References Cited

U.S. PATENT DOCUMENTS

| | | | | |
|---|---|---|---|---|
| 7,574,574 | B2* | 8/2009 | Heller | 711/162 |
| 2006/0179078 | A1* | 8/2006 | McLean | 707/104.1 |
| 2006/0212401 | A1* | 9/2006 | Ameerally et al. | 705/51 |
| 2006/0218187 | A1* | 9/2006 | Plastina et al. | 707/104.1 |
| 2006/0265403 | A1* | 11/2006 | Mercer et al. | 707/10 |
| 2007/0204227 | A1* | 8/2007 | Kretz | 715/727 |
| 2008/0086687 | A1* | 4/2008 | Sakai et al. | 715/716 |
| 2008/0104112 | A1* | 5/2008 | Nicholl et al. | 707/104.1 |
| 2009/0069915 | A1* | 3/2009 | Khedouri et al. | 700/94 |
| 2010/0076982 | A1* | 3/2010 | Gates et al. | 707/749 |
| 2010/0077355 | A1* | 3/2010 | Belinsky et al. | 715/835 |
| 2010/0114979 | A1* | 5/2010 | Petersen | 707/803 |
| 2010/0153846 | A1* | 6/2010 | Roy | 715/716 |
| 2010/0161090 | A1* | 6/2010 | Smolinski et al. | 700/94 |
| 2010/0318908 | A1* | 12/2010 | Neuman et al. | 715/716 |

\* cited by examiner

*Primary Examiner* — Ryan Pitaro
*Assistant Examiner* — Mahelet Shiberou
(74) *Attorney, Agent, or Firm* — Procopio, Cory, Hargreaves & Savitch, LLP

(57) ABSTRACT

Managing playlists, comprising: displaying a current playlist and one or more playlists that intersect the current playlist at a current media item; selecting one of the following: (1) when a pivot command to pivot from the current playlist to a pivoted playlist is received, first moving to a next media item of the pivoted playlist, and displaying the pivoted playlist and one or more playlists that intersect the pivoted playlist at the next media item of the pivoted playlist; (2) otherwise when no pivot command is received, second moving to a next media item of the current playlist, and displaying the current playlist and one or more playlists that intersect the current playlist at the next media item of the current playlist.

21 Claims, 4 Drawing Sheets

PIVOT COMMAND FOR PLAYLIST

BACKGROUND

1. Field of the Invention

The present invention relates to playlists, and more specifically, to using a pivot command to manage playlists.

2. Background

Portable media devices use playlists to organize and control media. Playlists allow a user to navigate through a collection of available audio, audio/visual and other related media or multimedia selections for playback. These may include, for example, songs, videos and multimedia presentations. A user traditionally plays songs, videos and/or multimedia presentations in one playlist before playing another playlist.

SUMMARY

The present invention provides for managing playlist by implementing a pivot command.

In one implementation, a method of managing playlists is disclosed. The method comprises: displaying a current playlist and one or more playlists that intersect the current playlist at a current media item; selecting one of the following: (1) when a pivot command to pivot from the current playlist to a pivoted playlist is received, first moving to a next media item of the pivoted playlist, and displaying the pivoted playlist and one or more playlists that intersect the pivoted playlist at the next media item of the pivoted playlist; (2) otherwise when no pivot command is received, second moving to a next media item of the current playlist, and displaying the current playlist and one or more playlists that intersect the current playlist at the next media item of the current playlist.

In another implementation, a portable media device which implements pivot commands for playlists is disclosed. The portable media device comprises: an input interface to invoke a pivot command to pivot from a current playlist to a pivoted playlist selected from one or more playlists that intersect the current playlist at a current media item; a display module to display the current playlist and the one or more playlists; and a processor configured to manage playlists including selecting one of the following: (1) when the pivot command is received, moving to a next media item of the pivoted playlist, and displaying on the display module the pivoted playlist and one or more playlists that intersect the pivoted playlist at the next media item of the pivoted playlist; (2) otherwise when no pivot command is received, moving to a next media item of the current playlist, and displaying the current playlist and one or more playlists that intersect the current playlist at the next media item of the current playlist.

In a further implementation, a non-transitory storage medium storing a computer program for managing playlists is disclosed. The computer program includes executable instructions that cause a computer to: display a current playlist and one or more playlists that intersect the current playlist at a current media item; select one of the following: (1) when a pivot command to pivot from the current playlist to a pivoted playlist is received, first move to a next media item of the pivoted playlist, and display the pivoted playlist and one or more playlists that intersect the pivoted playlist at the next media item of the pivoted playlist; (2) otherwise when no pivot command is received, second move to a next media item of the current playlist, and display the current playlist and one or more playlists that intersect the current playlist at the next media item of the current playlist.

Other features and advantages of the present invention will become more readily apparent to those of ordinary skill in the art after reviewing the following detailed description and accompanying drawings.

DETAILED DESCRIPTION

Figure 1:
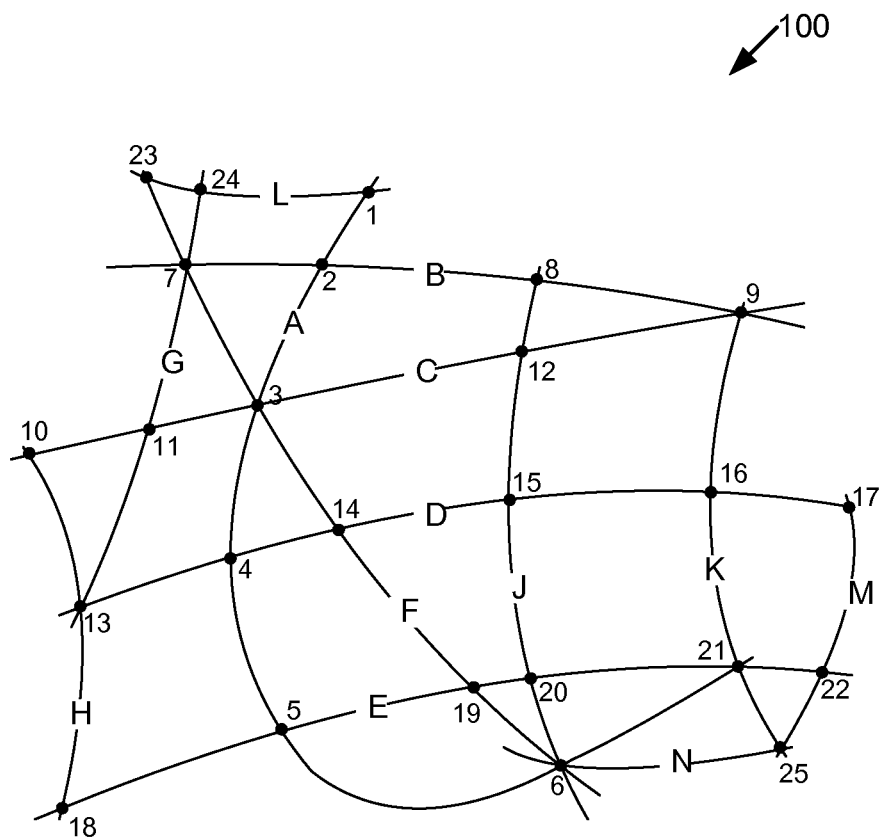
FIG. 1 shows a graphical representation of multiple playlists and relationships among those playlists in accordance with one implementation of the present invention.

A playlist refers to an ordered list of media items, including songs, videos and/or multimedia presentations, played during a given time period. It allows a desired atmosphere or styles to be created and maintained without constant user interaction. Such a playlist may be defined, stored, and selected to run either in sequence or, if a random playlist function is selected, in a random order. A playlist may be static or dynamic. For example, a dynamic playlist may include a list of songs that is generated periodically, such as for a shuffle or weekly top-25 list. A static playlist may include a list of songs that is preselected by a user.

The playlist traditionally enables the media items in one playlist to be played to the end before playing another playlist. For example, Playlist A may include user-defined songs 1, 2, 3, 4, 5, while Playlist B may include particular singer's songs 6, 7, 3, 8, 9, 10. Thus, when the user plays Playlist A and Playlist B in sequence, the order of songs played is 1-2-3-4-5-6-7-3-8-9-10. When the user plays the playlists in a random order, songs 1, 2, 3, 4, 5 would be played in any random order followed by songs 6, 7, 3, 8, 9, 10 in any random order. Since song 3 is common to both playlists, this may be a good "pivot" point at which to jump from one playlist (e.g., Playlist A) to another playlist (e.g., Playlist B).

Certain implementations as disclosed herein provide for directing playback of media items using playlists by allowing the user to transition from a first playlist to a second playlist at a given media item which appears in both playlists. In one implementation, there may be more than one playlist available to transition from the first playlist. Thus, the transition can be made from the first playlist to a third, fourth, or any other playlist. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

The rise in use of portable media devices, including mobile phones, with large memory space brought about a need for a change in the way media items are stored, presented, and managed. A playlist provides a method for organizing the media items by grouping them based on certain criteria, including atmosphere (e.g., "soft listening"), style (e.g., "rock and roll"), and artist (e.g., "Elvis Costello"). Thus, for example, if a playlist, including songs of a "rock and roll"

genre/style pre-selected by a user, is selected, the rock and roll songs in that playlist are played in sequence or in random order. While listening to an Elvis Costello song in the "rock and roll" playlist, the user may want to change the playlist (or "pivot") to the "Elvis Costello" playlist because the user likes the song and wants to hear more of his songs rather than continue listening to "rock and roll" songs of other artists.

FIG. 1 shows a graphical representation 100 of multiple playlists and relationships among those playlists in accordance with one implementation of the present invention. In the illustrated implementation of FIG. 1, Playlist A includes songs 1, 2, 3, 4, 5, 6, 21; Playlist B includes songs 7, 2, 8, 9; Playlist C includes songs 10, 11, 3, 12, 9; and so on. In one implementation, if the user selects Playlist A to be played in sequence, the songs may be played in sequence 1-2-3-4-5-6-21. In other implementations, if the user selects Playlist A to be played in sequence, the songs may be played starting from any song and in any direction. Thus, for example, the songs can be played in forward sequence 3-4-5-6-21-1-2, backward sequence 21-6-5-4-3-2-1, or other sequences.

When a playback of a playlist reaches an intersection with other playlist(s) in the graph 100, it indicates that the song of that intersection is present in all playlists that cross this intersection. Thus, the user can invoke a pivot command to change to another playlist that crosses this intersection. For example, in FIG. 1, when a playback of Playlist A reaches song 3, it can be seen that two other playlists (i.e., Playlist C and Playlist F) intersect Playlist A. Thus, a pivot command can be issued at this point in Playlist A to "pivot" to Playlist C or Playlist F.

In one implementation, a pivot command can be issued at any time once a song is reached (i.e., before, during, and after the playback of the song), and the "pivot" can occur once the song is finished. Thus, in this implementation, if a pivot command from Playlist A to Playlist C is issued while song 3 is being played, the playback of song 3 is not terminated until the end of song 3. The playback of the next song in Playlist C (i.e., song 12) is initiated once song 3 is completed. In another implementation, the "pivot" to another playlist can occur immediately upon issuing of a pivot command. Thus, in this implementation, if a pivot command from Playlist A to Playlist C is issued while song 3 is being played, the playback of song 3 is terminated and the playback of the next song in Playlist C (i.e., song 12) is initiated.

Although the graphical representation 100 shown in FIG. 1 seems to allow "pivot" only to a playlist that intersects a current playlist, a "pivot" command can allow a jump from a first playlist to a second playlist that does not directly intersect the first playlist. For example, in FIG. 1, Playlist B and Playlist D do not directly intersect each other. In one example, Playlist B is a group of Elvis Costello songs while Playlist D is a group of Elvis Presley songs. It can be seen that Playlist B and Playlist D are connected through Playlist G, F, A, J, or K. One or more of these playlists can be playlist(s) of rock and roll songs, and the selected playlist connects the two playlists, Playlist B and Playlist D. Thus, for example, while listening to an Elvis Costello song in Playlist B, the user is reminded of rock and roll songs by Elvis Presley. In this case, the user can request a "pivot" jump from a playlist of Elvis Costello songs to a playlist of Elvis Presley songs by "pivoting" through a rock and roll playlist (Playlist G, F, A, J, or K).

The logistics of a pivot jump command can be varied. For example, after listening to songs 7 and 2 in Playlist B (e.g., a playlist of Elvis Costello songs), the user listens to song 8. While the user is listening to song 8, the user is reminded of Elvis Presley songs which have a similar rock and roll style. Accordingly, the user requests a "pivot" jump to Playlist D (e.g., a playlist of Elvis Presley songs), which can be accomplished by issuing a pivot command first to Playlist J, a jump to song 15, and then another pivot command to Playlist D. However, a "pivot" jump to Playlist D can also be accomplished by issuing a jump to song 2 in Playlist B, a pivot command to Playlist A, and another pivot command to Playlist D. Thus, it can be seen that a "pivot" jump can be accomplished in many different ways.

Figure 2:
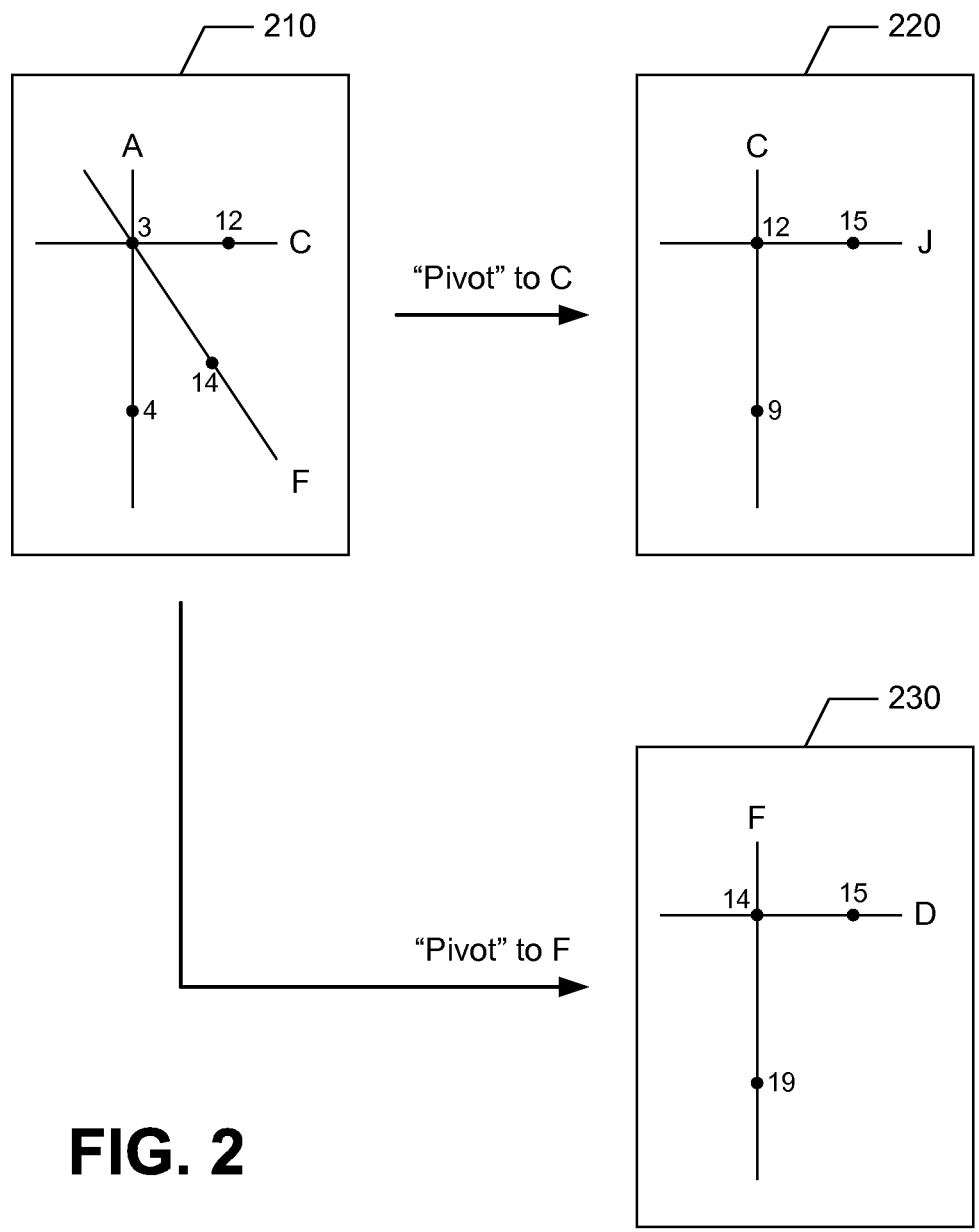
FIG. 2 shows one implementation of graphical displays which illustrate a process for a pivot command.

FIG. 2 shows one implementation of graphical displays 210, 220, 230 which illustrate a process for a pivot command. In one implementation, the graphical displays 210, 220, 230 represent illustrations of the pivot command process displayed on a portable media device.

In the illustrated implementation of FIG. 2, the graphical display 210 shows three playlists (i.e., Playlist A, Playlist C, and Playlist F) intersecting at song 3 consistent with the graphical representation 100 of FIG. 1. The playlist along the vertical line is the currently-playing playlist (i.e., Playlist A). The graphical display 210 shows that the next song in Playlist A is song 4. The graphical display 210 also shows that the user can request "pivot" from the currently-playing playlist (i.e., Playlist A) to two playlists (i.e., Playlist C and Playlist F). It further shows that the next song on Playlist C is song 12, while the next song on Playlist F is song 14.

Next songs of the playlists are displayed so that the user can be provided a short overview of the songs that might be available on different playlists. However, in other implementations, other items such as previous songs or next 5 songs can be displayed for the similar purposes.

The graphical display 220 shows the result of "pivot" from Playlist A to Playlist C, consistent with the graphical representation 100 of FIG. 1. Thus, the graphical display 220 shows Playlist C along the vertical line with a current song being song 12. It also shows that the next song on Playlist C is song 9. It further shows that Playlist J intersects Playlist C at song 12, and that the next song on Playlist J is song 15.

The graphical display 230 shows the result of "pivot" from Playlist A to Playlist F, consistent with the graphical representation 100 of FIG. 1. Thus, the graphical display 230 shows Playlist F along the vertical line with a current song being song 14. It also shows that the next song on Playlist F is song 19. It further shows that Playlist D intersects Playlist F at song 14, and that the next song on Playlist D is song 15.

In one implementation, pivot commands described above (in relation to FIG. 2) are implemented in a graphical user interface that allows selection of a playlist from a plurality of intersecting playlists shown. For example, in a configuration shown in graphical display 210, a screen area near letter C may be pressed to select and pivot to Playlist C shown in graphical display 220, or a screen area near letter F may be pressed to select and pivot to Playlist F shown in graphical display 230.

In another implementation, the pivot commands are accomplished by pressing a pivot button. For example, for a configuration shown in graphical display 210, a pivot button located near or within the display 210 (e.g., a physical push button near the graphical display 210 or graphical display button shown in the display 210). When the button is pressed for the first time, "pivot" to Playlist C shown in graphical display 220 is performed. When the button is pressed for the second time, "pivot" to Playlist F shown in graphical display 230 is performed. Thus, the pressing of the pivot button moves or pivots the playlist clockwise on a display.

In a further implementation, the pivot commands are accomplished in an integrated manner. For example, in conjunction with pressing and holding down of the pivot button, a wheel or trackball is scrolled or dragged to move a cursor on the screen to choose a playlist.

In other implementations, the pivot commands can be accomplished by voice commands, hardware-implemented instructions, software-implemented instructions, or other similar implementations. For example, the user issues a voice command such as "pivot" to select a next playlist. In another example, the user issues a voice command such as "pivot light blue" or "pivot Elvis Costello" to pivot to a user-defined "Light Blue" playlist or Elvis Costello playlist.

It should be noted that notations used above are for easy reference only. For example, a playlist may be described as Playlist A but may actually refer to "All Time Favorites of Elvis Costello." Further, for example, a song may be described as song 5 but may actually refer to Elvis Costello's song "Alison."

Figure 3:
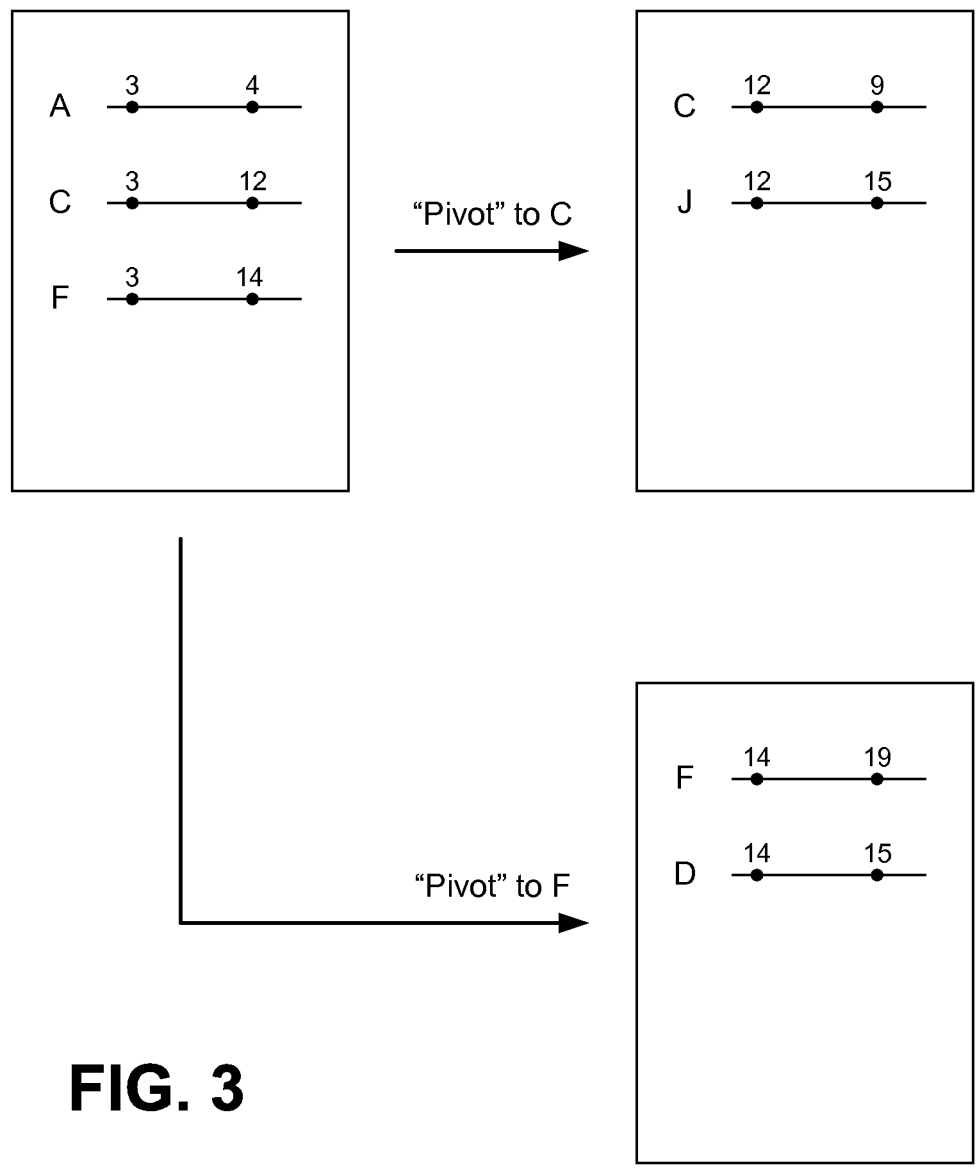
FIG. 3 shows another implementation of graphical displays which illustrate a process for a pivot command.

In other implementations, graphical displays different from those shown in FIG. 2 are used. For example, as shown in FIG. 3, a current playlist being played and all other playlists intersecting that playlist at the current song may be shown as rows of lines on a graphical display. Each playlist line would have a current song and a next song specified. When a pivot command is received, the next playlist on the rows of lines is brought up to the top and the remainder of the lines is now filled with all other playlists intersecting the selected playlist at the next song on that selected playlist.

Figure 4:
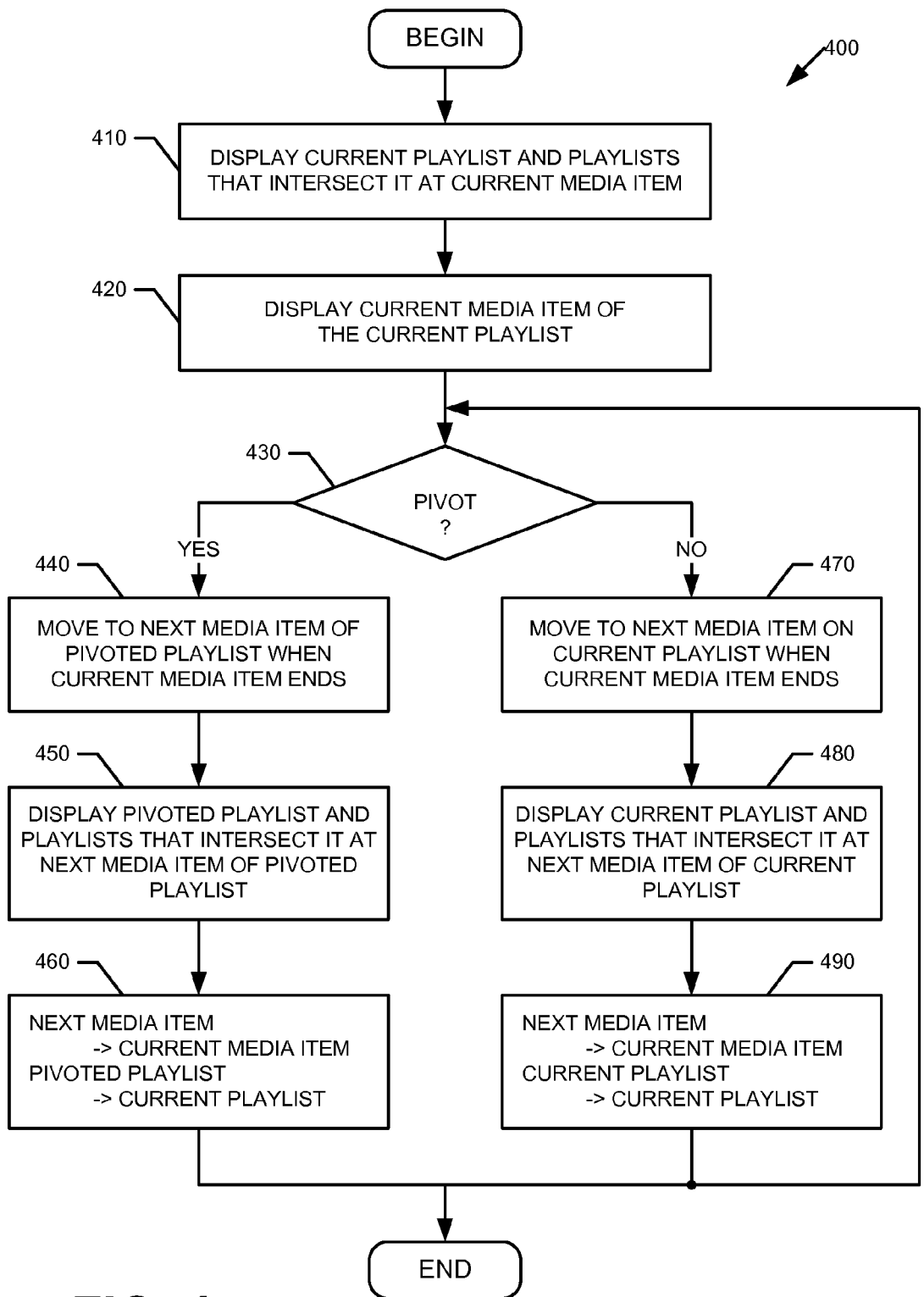
FIG. 4 is a flowchart illustrating a process for implementing a pivot command in accordance with one implementation of the present invention.

FIG. 4 is a flowchart 400 illustrating a process for managing playlists in accordance with one implementation of the present invention. In the illustrated implementation of FIG. 4, the current playlist and playlists that intersect it at the current media item are displayed, at box 410. As discussed in the graphical display 210 example of FIG. 2, the current playlist can be Playlist A and the playlists that intersect it at the current media item (e.g., song 3) can be Playlist C and Playlist F.

The current media item (e.g., song 3) of the current playlist (e.g., Playlist A) is displayed, at box 420. Further, the next media items (song 4 for Playlist A, song 12 for Playlist C, and song 14 for Playlist F) for the playlists can also be displayed. At box 430, an inquiry is made to determine if a pivot command has been received.

If a pivot command has been received, at box 430, a move is made to the next media item of the pivoted playlist when the current media item ends, at box 440. The term pivoted playlist refers to a playlist that is selected by the user's request for "pivot". For example, in relation to FIG. 2, a move is made to the next media item (e.g., song 12) of the pivoted playlist (e.g., Playlist C) when the current media item (song 3) ends. However, if the pivot command received at box 430 was in the form of "pivot to Playlist F" or "pivot jump to F", a move is made to the next media item (e.g., song 14) of another pivoted playlist (e.g., Playlist F) when the current media item (song 3) ends.

At box 450, the pivoted playlist and playlists that intersect it at the next media item of the pivoted playlist is displayed. For example, in relation to the graphical display 220 example of FIG. 2, the pivoted playlist (e.g., Playlist C) and playlists (e.g., Playlist J) that intersect it at the next media item (e.g., song 12) of the pivoted playlist (e.g., Playlist C) are displayed, at box 450. If the pivot command at box 430 was for "pivot to Playlist F", in relation to the graphical display 230 example of FIG. 2, another pivoted playlist (e.g., Playlist F) and playlists (e.g., Playlist D) that intersect it at the next media item (e.g., song 14) of the pivoted playlist (e.g., Playlist F) are displayed, at box 450. The terms are reset at box 460 so that the terms will be consistent in the next iteration. For example, the next media item will become the current media item, while the pivoted playlist will become the current playlist.

If a pivot command has not been received, at box 430, a move is made to the next media item of the current playlist when the current media item ends, at box 470. For example, in relation to FIG. 1, a move is made to the next media item (e.g., song 4) of the current playlist (e.g., Playlist A) when the current media item (song 3) ends. At box 480, the current playlist and playlists that intersect it at the next media item of the current playlist is displayed. For example, in relation to FIG. 1, the current playlist (e.g., Playlist A) and playlists (e.g., Playlist D) that intersect it at the next media item (e.g., song 4) of the current playlist (e.g., Playlist A) are displayed, at box 480. The terms are reset at box 490 so that the terms will be consistent in the next iteration. For example, the next media item will become the current media item.

In one implementation, a "pivot" to a playlist of media items can be made by a user to trigger presentation of recommended media items by a content provider/distributor. For example, while listening to "Lying Eyes" by The Eagles, the user may want to listen to rock and roll style songs by other singers that are similar in theme with the current song being played (e.g., "soft rock"). However, there may not be any songs by other singers that are similar in theme with the current song in the user's media library. Accordingly, a "pivot" to a recommended list of "soft rock" songs may trigger a request to a content provider/distributor to automatically prepare and deliver a list of song snippets that would allow the user to sample the songs.

The user can then select songs from the list of song snippets to buy only the songs that the user wants to buy. Thus, if the user selects at least one song (e.g., songs x, y, and z), a playlist of songs including the selected song(s) can be formed to intersect the playlist from which a "pivot" was made. In the example above, a playlist of songs "Lying Eyes", x, y, and z would form a new playlist (e.g., "soft rock") that intersects Playlist of songs by The Eagles at song "Lying Eyes."

To provide a "pivot" to a recommended list of media items, each media item would include pivot metadata such as a theme, style, or category so that, in the example above, songs in a "soft rock" category can be recommended by a content provider/distributor.

In other implementations, pivot metadata can include other information with which to recommend media items. For example, the pivot metadata can include singer's name, year the song was released, tempo (e.g., slow or fast), political affiliation of the podcast, studio that released the movie, and various other information related to the media item.

The description herein of the disclosed implementations is provided to enable any person skilled in the art to make or use the invention. Numerous modifications to these implementations would be readily apparent to those skilled in the art, and the principals defined herein can be applied to other implementations without departing from the spirit or scope of the invention. Although the examples described above discuss playlists of songs, a playlist can be configured to include any items of media such as images, movies, multimedia presentations, electronic news articles, podcast files, streamed webcasts, and the like. Thus, the invention is not intended to be limited to the implementations shown herein but is to be accorded the widest scope consistent with the principal and novel features disclosed herein.

Various implementations of the invention are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices and audio devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

The invention claimed is:

1. A method of managing playlists, comprising:
    displaying a current playlist and one or more playlists that intersect the current playlist at a current media item;
    when a pivot command to pivot from the current playlist to a jump playlist is received, wherein the jump playlist is a playlist that does not intersect the current playlist,
        (a) first moving to a next media item of a pivoted playlist, wherein the pivoted playlist intersects the current playlist at the next media item,
        (b) next moving to a next media item of the pivoted playlist that intersects the jump playlist,
        (c) displaying the jump playlist and the one or more playlists that intersect the jump playlist at the next media item of the jump playlist;
    triggering a request to a content provider to prepare and deliver the jump playlist as a playlist of recommended media items, which includes shorter versions of media items provided by the content provider to encourage the purchase of full versions of the media items.

2. The method of claim 1, further comprising
    displaying the current media item of the current playlist and the one or more playlists that intersect the current playlist.

3. The method of claim 2, further comprising
    displaying a next media item for each of the current playlist and the one or more playlists that intersect the current playlist.

4. The method of claim 1, wherein the first moving occurs when the current media item ends its presentation.

5. The method of claim 1, wherein the first moving occurs as soon as the pivot command is received.

6. The method of claim 1, further comprising displaying the next media item of the current playlist.

7. The method of claim 1, wherein displaying a current playlist and one or more playlists comprises graphically displaying the current playlist and one or more playlists.

8. The method of claim 7, wherein the current playlist is graphically displayed as a vertical line showing the current media item and the next media item on the vertical line.

9. The method of claim 8, wherein the one or more playlists are graphically displayed as non-vertical lines intersecting the vertical line at the current media item.

10. The method of claim 9, wherein the pivoted playlist is graphically displayed as being immediately following the current playlist.

11. The method of claim 1, further comprising providing a user interface to transmit the pivot command.

12. A portable media device which implements pivot commands for playlists, the portable media device comprising:
    an input interface to invoke a pivot command to pivot from a current playlist to a pivoted playlist selected from one or more playlists that intersect the current playlist at a current media item;
    a display module to display the current playlist and the one or more playlists; and
    a processor configured to manage playlists including:
    when the pivot command to pivot from the current playlist to a jump playlist is received, wherein the jump playlist is a playlist that does not intersect the current playlist,
        (a) first moving to a next media item of the pivoted playlist, wherein the pivoted playlist intersects the current playlist at the next media item,
        (b) next moving to a next media item of the pivoted playlist that intersects the jump playlist, and
        (c) displaying on the display module the jump playlist and the one or more playlists that intersect the jump playlist at the next media item of the jump playlist;
    the processor configured to trigger a request to a content provider to prepare and deliver the jump playlist as a playlist of recommended media items, which includes shorter versions of media items provided by the content provider to encourage the purchase of full versions of the media items.

13. The portable media device of claim 12, wherein the input interface comprises
    a push button to invoke the pivot command to pivot from the current playlist to the pivoted playlist.

14. The portable media device of claim 12, wherein the input interface comprises
    one or more graphical input means to invoke the pivot command by selecting the pivoted playlist from the one or more playlists that intersect the current playlist at the current media item.

15. The portable media device of claim 12, wherein media items of playlists comprise at least one of songs, images, movies, multimedia presentations, electronic news articles, podcast files, and streamed webcasts.

16. A non-transitory storage medium storing a computer program for managing playlists, the computer program comprising executable instructions that cause a computer to:

display a current playlist and one or more playlists that intersect the current playlist at a current media item;

when a pivot command to pivot from the current playlist to a jump playlist is received, wherein the jump playlist is a playlist that does not intersect the current playlist,
(a) first move to a next media item of a pivoted playlist, wherein the pivoted playlist intersects the current playlist at the next media item,
(b) next moving to a next media item of the pivoted playlist that intersects the jump playlist,
(c) display the jump playlist and the one or more playlists that intersect the pivoted playlist at the next media item of the jump playlist;

trigger a request to a content provider to prepare and deliver the jump playlist as a playlist of recommended media items, which includes shorter versions of media items provided by the content provider to encourage the purchase of full versions of the media items.

17. The non-transitory storage medium of claim 16, wherein executable instructions that cause a computer to display a current playlist and one or more playlists comprise executable instructions that cause a computer to graphically display the current playlist and one or more playlists.

18. The non-transitory storage medium of claim 16, wherein the current playlist is graphically displayed as a vertical line showing the current media item and the next media item on the vertical line.

19. The non-transitory storage medium of claim 18, wherein the one or more playlists are graphically displayed as non-vertical lines intersecting the vertical line at the current media item.

20. The non-transitory storage medium of claim 19, wherein the pivoted playlist is graphically displayed as being immediately following the current playlist.

21. The method of claim 1, further comprising
providing an overview of the next media item of the jump playlist.

* * * * *